US005198296A

United States Patent [19]

Suzuki et al.

[11] Patent Number: 5,198,296

[45] Date of Patent: Mar. 30, 1993

[54] THERMO-TRANSFER SHEET

[75] Inventors: Takeo Suzuki; Hideichiro Takeda; Shigeki Umise; Keiichi Ogawa, all of Tokyo, Japan

[73] Assignee: Dai Nippon Insatsu K.K., Tokyo, Japan

[21] Appl. No.: 428,674

[22] Filed: Oct. 30, 1989

[30] Foreign Application Priority Data

Oct. 28, 1988 [JP] Japan ........................... 63-139977[U]
Nov. 28, 1988 [JP] Japan ........................... 63-298336
Jan. 31, 1989 [JP] Japan ........................... 1-19859

[51] Int. Cl.[5] ........................ B32B 27/06

[52] U.S. Cl. ........................ 428/336; 428/195; 428/349; 428/913; 428/914

[58] Field of Search ............... 428/195, 207, 484, 500, 428/522, 913, 914, 336, 343, 346, 347, 349

[56] References Cited

U.S. PATENT DOCUMENTS 4,704,310 11/1987 Tighe et al. ........................ 427/261
4,978,580 12/1990 Tezuka et al. ...................... 428/195

FOREIGN PATENT DOCUMENTS 0214298 2/1986 European Pat. Off. ........... 428/195
2163270 6/1985 United Kingdom ................ 428/195
2178558 7/1986 United Kingdom ................ 428/195

*Primary Examiner*—Pamela R. Schwartz
*Attorney, Agent, or Firm*—Sughrue, Mion, Zinn, Macpeak & Seas

[57] ABSTRACT

A thermo-transfer sheet is composed of a base film and an ink layer to be transferred having a softening point of more than 120° C. A label is formed by the thermo-transfer sheet and provided with an image ink layer formed on a thermo-transfer image receiving sheet through a temperature-sensitive adhesive layer and the image ink layer has a softening point of more than 120° C. The thermo-transfer sheet and the thermo-transfer image receiving sheet are prepared and a temperature-sensitive adhesive layer is formed on at least one of the surface of the thermo-transfer sheet or the transfer ink layer of the thermo-transfer image receiving sheet. These sheets are laminated and the laminated sheets are heated by means of a thermal head to thereby transfer the image ink layer having a softening point of more than 120° C. on the thermo-transfer image receiving sheet. According to these processes, a label such as bar code is manufactured with an excellent durability such as friction-proof property, solvent-proof property and heat-proof property.

3 Claims, 3 Drawing Sheets

FIG. 6A
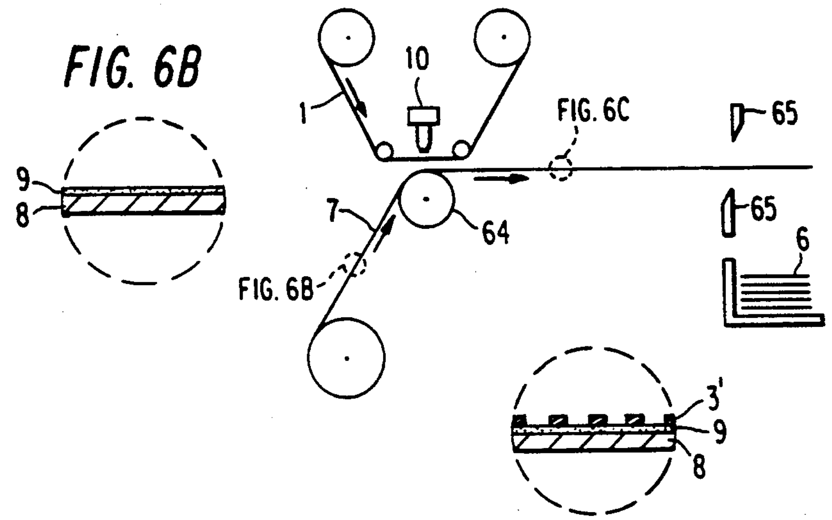
FIG. 6C
FIG. 7A
FIG. 7D
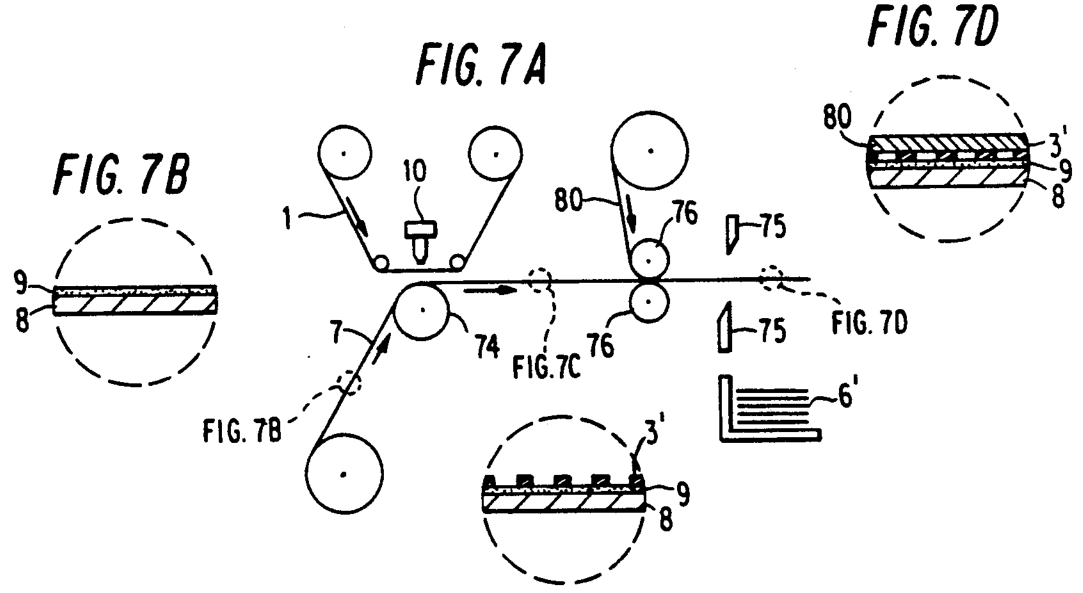
FIG. 7C

THERMO-TRANSFER SHEET

BACKGROUND OF THE INVENTION

This invention relates to a thermo-transfer sheet, a label utilizing the sheet and being provided with a printed picture superior in friction-proof property, oil-proof property, water-proof property, and heat-proof property, and a method for manufacturing the same.

Recently, various kinds of commercial products have applied labels on which various kinds of letters, numeral, symbols, patterns, and optically readable images, particularly in the form of bar codes, for the selling and managing of the products. Labels and the like characters have been widely utilized for the manufacturing, quality control, storing, and delivery of the products.

In one example of the conventional bar code, a number of lines constituting a bar code are recorded on a bar code label sheet and such bar code label sheets have been prepared in mass production by printing the bar codes with usual printing ink. On the other hand, in a small product production, a thermo-transfer printer has been utilized as a convenient printing method. In the bar code printing method by the utilization of such thermo-transfer printer, a thermo-transfer sheet consists of a base film having one surface on which a thermally fusible ink layer is formed.

The basic film of such a conventional thermo-transfer sheet is prepared by a paper made of paraffin paper or condenser paper having a thickness of 10 to 20 μm, or a plastic film such as polyester or cellophane having a thickness of 3 to 20 μm and by coating a thermally fusible ink layer prepared by mixing wax with a coloring agent such as pigment or die.

Such a known thermo-transfer sheet is formed by heating the sheet from the rear side in accordance with an image by a thermal head and fusing the transfer ink layer on an image receiving sheet. The ink layer is formed of a material having a low melting point for the reason that the image is formed on the material to be transferred due to the adhesive property, caused by the heating, of the ink layer. For this reason, the image on the thermally transferred material is inferior in the friction-proof property, the solvent-proof property, and the heat-proof property and, accordingly, the image is easily worn or peeled off by friction, or white color portions near the printed portions of the image are also easily damaged or contaminated.

Such adverse problems are significant for the thermo-transfer sheets utilized in art fields in which the superior friction-proof property, solvent-proof property and heat-proof property are required, for example, in the preparation of the bar codes.

For instance, the conventional thermo-transfer type bar codes will not be applied to portions at which products often contact to each other, mechanical oil exists, or the bar codes are often liable to be heated.

In order to solve these problems, there is provided a method in which a transparent cover film made of a thin polyester film, for example, is laminated to cover the surface of the bar code label to protect the same. According to this method, it is possible to manufacture a bar code label superior in the friction-proof property, but there remains a problem such that the printed wax ink layer is again softened or fused during the fusing, heating or pressing process of the bonding agent at a time when the cover film is laminated. These adverse phenomena may finally result in the diffusing of the printed image and the lowering of the resolving ability thereof.

In order to solve the problem described above, there is provided a method in which a thermo-plastic resin having compatibility with an ink vehicle of a thermo-transfer ink sheet is applied to a material to be transferred, such as disclosed in the Japanese Patent Laid-open Publication Nos. 63-193884 and 63-194981. However, with this method, the problems of the diffusing of the printed image and the lowering of the resolving ability cannot be satisfactorily solved. Moreover, in this method, the transparent cover film laminating process is additionally required, which results in the increasing of the manufacturing cost of the bar code label.

The described problems may be common to the labels on which printed images or pictures such as letters, numerals, symbols, patterns, or optically readable images other than the bar code labels are present.

SUMMARY OF THE INVENTION

An object of this invention is to substantially eliminate the defects or drawbacks described above encountered in the prior art and to provide a thermo-transfer sheet provided with a durability such as a friction-proof property, an oil-proof property, a water-proof property, and a heat-proof property, to provide a label by utilizing the thermo-transfer sheet having the character described above and to provide a method of manufacturing the label.

This and other objects can be achieved in one aspect according to this invention by providing a thermo-transfer sheet to be laminated on a thermo-transfer image receiving sheet and heated by a thermal head from a rear side of the thermo-transfer sheet to print an ink image having a predetermined area on the thermo-transfer image receiving sheet, the thermo-transferring sheet comprising a base film and a transfer ink layer formed on one surface of the base film, the transfer ink layer having a softening point of more than 120 ° C.

In another aspect according to this invention, there is provided a label comprising a thermo-transfer image receiving sheet, an image ink layer formed on a surface of the thermo-transfer image receiving sheet through a thermo-transfer sheet by means of a thermal head, and a temperature-sensitive adhesive layer formed between the thermo-transfer image receiving sheet and the image ink layer, the image ink layer having a softening point of more than 120° C.

In a further aspect of this invention, there is provided a method of manufacturing a label provided with a thermo-transfer image receiving sheet provided with a temperature-sensitive adhesive layer and an image ink layer formed on the thermo-transfer image receiving sheet, the method comprising the steps of preparing a thermo-transfer sheet, laminating the thermo-transfer sheet to the thermo-transfer image receiving sheet provided with the temperature-sensitive adhesive layer, and thermally processing the thermo-transfer sheet from a rear side thereof by means of a thermal head so as to form an image ink layer consisting of an ink having a softening point of more than 120° C. on the temperature-sensitive adhesive layer of the thermo-transfer image receiving sheet.

In a still further aspect of this invention, there is provided a method of manufacturing a label provided with a thermo-transfer image receiving sheet and an ink image layer formed on the thermo-transfer image receiving sheet, the method comprising the steps of preparing a thermo-transfer sheet provided with a transfer ink layer and a temperature-sensitive adhesive layer formed on the transfer ink layer, laminating the thermo-transfer sheet to the thermo-transfer image receiving sheet, and thermally processing the thermo-transfer sheet from a rear side thereof by means of a thermal head so as to form an image ink layer consisting of an ink having a softening point of more than 120° C. on the thermo-transfer image receiving sheet through the temperature-sensitive adhesive layer of the thermo-transfer sheet.

According to the thermo-transfer sheet of the character described above, the thermo-transfer sheet can be prepared due to the presence of the image ink layer having a suitable softening point with excellent durability such as a friction-proof property, an oil-proof property, a water-proof property, and a heat-proof property. A label such as a bar code can also be prepared by utilizing the thermo-transfer sheet having the character described above. The thermo-transfer sheet and the label can be manufactured effectively in the presence of the ink layer having an effective softening point.

BRIEF DESCRIPTION OF THE DRAWINGS

In the accompanying drawings:

FIG. 6A is a schematic view of a system for preparing a label according to one aspect of this invention; and FIG. 6B is a schematic view which shows the thermo-transfer image receiving sheet as it is fed from a roll to a platen roll of a printer.

FIG. 6C is a schematic view which shows the thermo-transfer image receiving sheet after it has been laminated to the thermo-transfer sheet on the outer periphery of the platen roll and printed with the desired image ink layer by a thermal head.

FIG. 7A is a schematic view of a system for preparing a label according to another aspect of this invention.

FIG. 7B is a schematic view which shows the thermo-transfer image receiving sheet after being fed from a roll to a platen roll of a printer.

FIG. 7C is a schematic view which shows the thermo-transfer image receiving sheet after being laminated to the thermo-transfer sheet on the platen roll and printing has been performed by a thermal head to form the desired image ink layer on the temperature sensitive adhesive layer of the image receiving sheet.

FIG. 7D is a schematic view which shows the thermo-transfer image receiving sheet carrying the image ink layer after it has passed through a laminating machine in which a transparent film has been laminated thereon and following cutting to obtain a desired label as a product.

DESCRIPTION OF THE PREFERRED EMBODIMENTS

Figure 1:
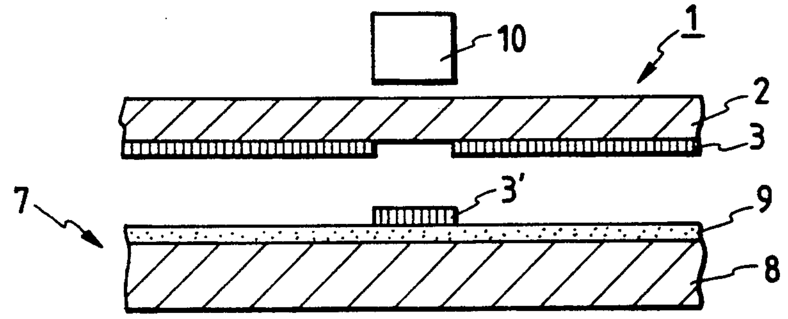
FIG. 1 is a sectional view of a thermo-transfer sheet during a thermal transferring process according to the first embodiment of this invention.

FIG. 1 is a sectional view showing a thermo-transfer sheet according to the first embodiment of this invention in a thermal transferring process. Referring to FIG. 1, a thermo-transfer sheet 1 is prepared with a thin film 2 as a basic material having one surface on which a thermo-transfer ink layer 3 having a softening point of more than 120° C. is formed.

A base film used for a conventional thermo-transfer sheet may be utilized for the base film 2 of this embodiment and other materials may be utilized therefor with no specific limitation.

The followings are preferred examples of the material for the base film 2 to be utilized for this embodiment.

Plastics such as polyester, polypropylene, cellophane, polycarbonate, cellulose acetate, polyethylene, polyvinyl chloride, polystyrene, nylon, polyimide, polyvinylidene chloride, polyvinyl alcohol, fluorine-resin, rubber chloride, ionomer; Condenser paper; Paraffin paper; or Non-woven fabric; or a combination of these materials.

The thickness of the base film 2 is optionally selected in accordance with the strength and the thermo-conductivity thereof, preferably of 2 to 25 μm, for example.

The ink layer 3 is not formed by a conventional ink which utilizes a wax as a binder, but formed of an usual offset ink or gravure ink, the latter being preferred. As the binder for the gravure ink is utilized a natural resin such as shellac, rosin, rosin-modified maleic acid, nitrocellulose, cellulose acetate, polyamide, rubber chloride, or cyclized rubber; a derivative of each of these material; or a synthetic resin such as vinyl chloride, ethylene-vinyl acetate copolymer, chlorinated polypropylene, acryl resin, urethane resin, or isocyanate resin. It is desired that the binder contain one or more kinds of resins having reactive groups such as hydroxyl group, carboxyl group, amino group, isocyanate group, or the like. However, the hardening agent itself is bridged to solidify the binder so that the ink layer which is not fusible by heat is formed. According to this embodiment, the desired friction-proof property, the solvent-proof property, and the heat-proof property can be achieved by adding and mixing the hardening agent which acts to a reactive group in the binder or hardening agent which itself is bridged, for example polyisocyanate compound, epoxy compound, or polyol and then coating and finally hardening the mixture.

Carbon black is utilized for a coloring agent. As a solvent is utilized a solvent of alcohol series such as methanol, ethano, IPA, or n-butanol; solvent of ester series such as methyl acetate, ethyl acetate, or n-butyl acetate; solvent of ketone series such as acetone, MEK, MIBK, or cyclohexanone; alcohol derivatives such as methyl cellosolve, ethyl cellosolve, or butyl cellosolve; or aromatic solvent such as benzole, toluol, or xylol; or aliphatic solvent such as n-hexane or cyclohexane.

The following additives may be added as occasion demands.

Plasticizer such as phthalic acid ester series, fatty acid ester series, phosphate, or epoxy series.

Antioxidant such as metal soap series, phenol series, sulfide series, or phosphide series.

Ultraviolet absorbing agent such as benzophenone series, triazole series, or acrylate series.

Lubricant such as paraffin wax, hydrocarbon series, fatty acid series, amide fatty acid series, ester series, or alcohol series.

Antifoaming agent such as alcohol series, fatty acid series, fatty acid ester series, amide series, phosphate, or silicone oil series.

Antistatic agent such as anionic, cationic, nonionic or amphoteric surface active agent.

In a case where it is required for a printed matter to have high solvent-proof property, heat-proof property and friction-proof property, it is preferred to add a cross linking agent such as polyisocyanate or epoxy to the ink layer.

The softening point of the transfer ink layer 3 of the structure described above is more than 120° C. and, preferably, in a range of 160° to 300° C. Below the softening point of 120° C., sufficient durability of the image ink layer is not attained. Over the softening point of 300° C., the thermo-transferring process by means of the thermal head cannot be effectively performed. According to the transfer ink layer 3 of the structure described above, an image ink layer formed on the sheet, on which a thermally transferred image is formed, and printed by the thermal head is provided with high friction-proof property, solvent-proof property and heat-proof property, thus attaining high durability.

In spite of the above matter, in a case where the ink layer 3 has a relatively large thickness, it will be desired for the ink layer 3 to have a thickness of 0.1 to 5 μm for improving the cut condition of the ink film in the thermally transferring process.

In the case where the gravure ink is used as described above, since the pigment is fully dispersed, sufficient coloring concentration will be achieved even in the ink film layer having a thin thickness.

As a method of forming the transfer ink layer 3 is provided a method in which the ink is coated and dried by means of gravure coat, gravure reverse coat, roll coat, or the like and there is no limitation to the coating method in this embodiment.

Referring to FIG. 1, an image receiving sheet 7 on which an image is thermally transferred is essentially composed of a base material 8 and a temperature-sensitive adhesive layer 9 formed on one surface of the base material 8.

The base material 8 may be optionally selected from a plastic film, a usual paper, a label paper, a synthetic paper, or a product of metal, wood, glass or resin and other material may be also utilized. A transparent plastic film of known type, made of such as polyester, polyethylene, polypropylene, polyvinyl chloride, cellulose acetate, or polycarbonate will be utilized as the base material 8. It may be desired for such transparent plastic film to have a thickness of 5 to 50 μm.

It is desired to prepare the temperature-sensitive adhesive layer with a thermo-plastic resin which is softened at a temperature of about 50° to 200° C. to thereby provide a bonding property and as a material of the temperature-sensitive adhesive layer 9 is listed up ethylene-vinyl acetate copolymer (EVA), ethylene-acrylate copolymer (EEA), polyethylene, polypropylene, polystyrene, polybutene, petroleum resin, vinyl chloride resin, vinyl chloride-vinyl acetate copolymer, polyvinyl alcohol, polyvinylidene chloride resin, methacrylic resin, polyamide, polycarbonate, polyvinyl formal, polyvinyl butyral, acetylcellulose, polyvinyl acetate, polyisobutylene, polyacetal or the like. Particularly, it is desired to use a conventionally used temperature-sensitive adhesive having a relatively low softening point of about 50° to 150° C., for example.

The layer mainly composed of the temperature-sensitive adhesive is formed by coating a hot melt coat or a coating liquid prepared by disolving or dispersing the resin having adhesive property in a proper solvent or water and then drying the same so as to have a thickness of 1 to 20 μm in a preferred example. It is of course desired for the temperature-sensitive adhesive layer to have a transparent property.

A blocking preventing agent such as wax, higher fatty acid amide, higher fatty acid ester, higher fatty acid salt, fluorine-resin powder, or inorganic substance powder may be added to the temperature-sensitive adhesive layer 9 to prevent the blocking at a time when the image receiving sheet 7 is rolled up. The blocking preventing agent can act to prevent the adhesion of the thermo-transfer sheet 1 to the image receiving sheet 7 having the adhesive layer 9 during the thermally transferring process.

The thermo-transferring method of the thermo-transfer sheet 1 and the image receiving sheet 7 will be described hereunder with reference to FIG. 1. The thermo-transfer sheet 1 is first laminated on the thermo-transfer image receiving sheet 7 having one surface on which the temperature-sensitive adhesive layer 9 is formed. The thus laminated sheets are heated from the rear side by the thermal head 10 along the image, whereby the temperature-sensitive adhesive layer 9 is softened and made adhesive and the ink layer 2 is also somewhat softened by the heat. Accordingly, the image ink layer 3' is transferred to the temperature-sensitive adhesive layer 9. As described above, according to the embodiment of this invention, the ink layer 3 is not fused during the thermally transferring process, but the ink layer 3 is easily transferred by the presence of the temperature-sensitive adhesive layer 9. The thus transferred ink image 3' is not made of wax having a low melting temperature, but formed of the usual printing ink, so that the transferred ink image 3' provides the extremely excellent friction-proof property, solvent-proof property, heat-proof property, and the water-proof property and, accordingly, the white color portion near the printed portion is substantially not contaminated by the friction, the heat and the solvent.

In addition, the printed material formed by the described manner is provided on the surface thereof with the temperature-sensitive adhesive layer, so that a cover film such as transparent film can be easily laminated.

Figure 2:
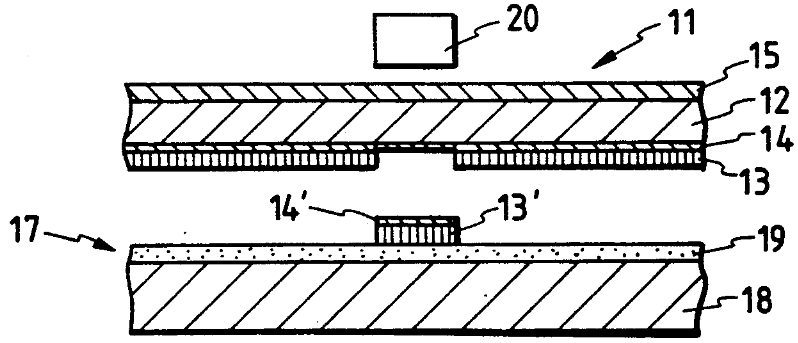
FIG. 2 is also a sectional view similar to that shown in FIG. 1 according to the second embodiment of this invention.

FIG. 2 represents the second embodiment of the thermo-transfer sheet according to this invention, in which a release layer 14 is formed between a base film material 12 and a transfer ink layer 13 to enhance the releasing performance of the ink layer 13. As a material for the release layer 14 a material which has a low adhesive property with respect to the transfer ink layer 13 at the thermo-transferring process will be optionally selected from silicone-modified acryl resin, silicon-modified urethane resin, chlorinated polypropylene, rubber chloride, polyvinyl alcohol, and the like.

It is desired to provide a heat resisting layer 15 on one surface of the base film 12 facing a thermal head 20 in order to prevent the adhesion of the thermal head 20, to improve the scanning performance thereof and to prevent the thermo-transfer sheet from charging.

A thermo-transfer image receiving sheet 17 of the second embodiment is the same character as that of the first embodiment shown in FIG. 1 and a temperature-sensitive adhesive layer 19 is applied to one surface of the base material 18.

With the second embodiment in which the thermo-transfer sheet 11 and the image receiving sheet 17 of the character described above are image printed by utilizing the thermal head 20 by the manner substantially equal to that described with reference to the first embodiment, the image ink layer 13' is formed on the temperature-sensitive adhesive layer 19.

During the transferring process described above, by adding an additive such as wax to the release layer 14, a portion 14' of the release layer is released when the transfer ink layer 13 is transferred from the base film 12 and the released release layer 14' remains on the transferred image ink layer 13' and, hence, the layer 14' provides a protecting function for improving the durability of the image ink layer 13' because the layer 14' provides a sleeping property when a contact type bar code reader, for example, is scanned on the layer 14'. Microcrystalline wax, carnauba wax, paraffin wax or the like wax may be utilized for the additive to be added to the release layer 14. Fischer-Tropsch wax, various kinds of low molecular-weight polyethylene waxes, haze wax, bees wax, spermaceti, insect wax, wool wax, shellac vannish, candelilla wax, petrolatum, polyester wax, partial modified wax, fatty ester, or fatty amide may be also utilized as the additive wax.

Although the thermally transferred image is rich in luster and of fine appearance, it may be somewhat difficult to clearly read letters and, accordingly, in some case, flat print letters may be required. In such case, the ink layer may be formed on a mat layer which is formed by coating, on the base film, a substance prepared by dispersing an inorganic pigment such as silica or calcium carbonate into a solvent, or the base film itself may be subjected to mat working.

Figure 3:
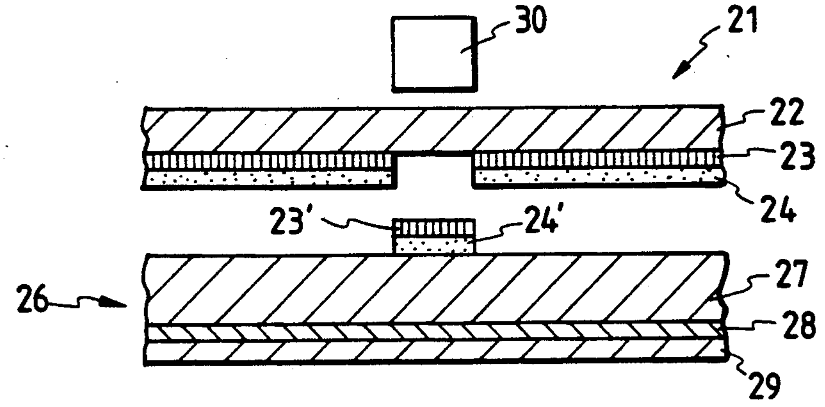
FIG. 3 is also a sectional view similar to that shown in FIGS. 1 or 2 according to the third embodiment of this invention.
Figure 4:
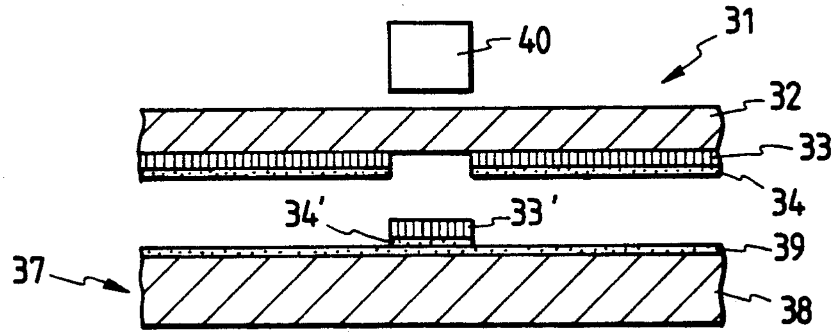
FIG. 4 is also a sectional view similar to that shown in FIGS. 1, 2 or 3 according to the fourth embodiment of this invention.
Figure 5:
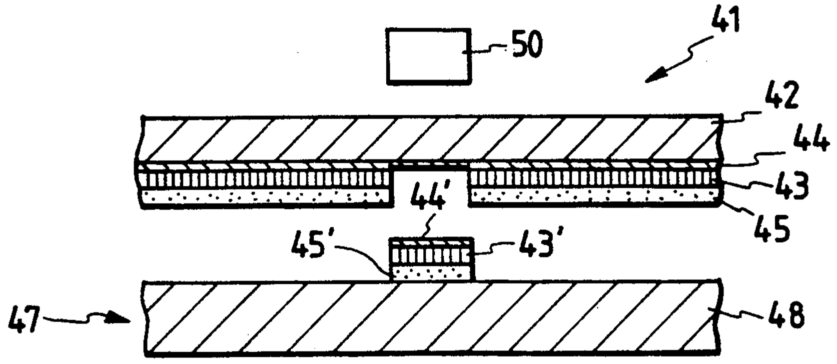
FIG. 5 is also a sectional view similar to that shown in FIGS. 1, 2, 3 or 4 according to the fifth embodiment of this invention.

FIGS. 3 to 5 represent the third to fifth embodiments of the thermo-tıansfer sheet in a thermally transferring process according to this invention.

Referring to FIG. 3, a thermo-transfer sheet 21 is composed of a base film 22, a thermo-transfer ink layer 23 formed on one surface of the base film 21, and a temperature-sensitive adhesive layer 24 formed on the surface of the ink layer 23. For the materials for the ink of the ink layer 23 and the bonding agent of the adhesive layer 24, substantially the same materials as those referred to with respect to the first embodiment with reference to FIG. 1 will be utilized. In a case where such thermo-transfer sheet 21 is utilized, a temperature-sensitive adhesive layer may not be provided for a thermo-transfer image receiving sheet 26. The image receiving sheet 26 shown in FIG. 3 is composed of a base material 27, an adhesive layer 28 formed on the rear surface of the base material 27, and a release paper 29 bonded to the surface of the adhesive layer 28. When the thermo-transfer sheet 21 of the character described above is subjected to the thermo-transferring process by a thermal head 30 so as to print the image on the image receiving sheet 26, the image ink layer 23' is transferred on the image receiving sheet 26 through the temperature-sensitive adhesive layer 24'. In this process, even in a case where the temperature-sensitive adhesive layer is not formed on the image receiving sheet 26, the thermo-transferring process can be easily and exactly performed because of the presence of the temperature-sensitive adhesive layer on the thermo-transfer sheet 21.

Referring to FIG. 4, a thermo-transfer sheet 31 is composed of, as shown in FIG. 3, a base film 32, a thermo-transfer ink layer 33 formed on one surface of the base film 32, and a temperature-sensitive adhesive layer 34 formed on the surface of the ink layer 33. A thermo-transfer image receiving sheet 37 is also provided with a base material 38 having a surface on which a temperature-sensitive adhesive layer 39 is formed. When the thermo-transfer sheet 31 of the character described above is subjected to the thermo-transferring process by a thermal head 40 so as to print the image on the image receiving sheet 37, the image ink layer 33' is transferred on the image receiving sheet 37 through the temperature-sensitive adhesive layer 34'. In this process, since the temperature-sensitive adhesive layers are formed on both the thermo-transfer sheet 31 and the image receiving sheet 37, the thermo-transfer process can be easily performed and the thicknesses of these temperature-sensitive adhesive layers can be made thin in comparison with those of the embodiments shown in FIGS. 1 to 3.

Referring to FIG. 5, a thermo-transfer sheet 41 is composed of a base film 42, a transfer ink layer 43 with a release layer 44 interposed between the base film 42 and the ink layer 43, and a temperature-sensitive adhesive layer 45 formed on the surface of the ink layer 43. A thermo-transfer image receiving sheet 47 is mainly composed of a base material 48. When the thermo-transfer sheet 41 of the character described above is subjected to the thermo-transferring process, an image ink layer 43' is transferred to the image receiving sheet 47 through a temperature-sensitive adhesive layer 45' by means of a thermal head 50 and the image ink layer 43' is provided on the outer surface thereof with a cut release layer acting as a protective layer 44'. In the illustrated embodiment, the image receiving sheet 47 is not provided with the temperature-sensitive adhesive layer, but the image receiving sheet 37 as shown in FIG. 4 may be substituted for the image receiving sheet 47 of FIG. 5.

With the foregoing embodiments represented by FIGS. 3 to 5, a blocking preventing agent of the type described hereinbefore may be added in the temperature-sensitive adhesive layers of the thermo-transfer sheets 21, 31 and 41 for preventing the blocking which may be caused at a time when the thermo-transfer sheet is rolled up.

FIG. 6 is an schematic view for representing a method of manufacturing a label according to this invention. Referring to FIG. 6, the thermo-transfer image receiving sheet 7 of the character described with reference to the first embodiment rolled up around a roll, not numbered, is fed to a platen roll 64 of a printer. The thermo-transfer sheet 1 of the character described above is laminated during the passing of the image receiving sheet 7 on the outer periphery of the platen roll 64 and a printing process is carried out by the thermal head 10 so as to print the desired image ink layer 3', for example a bar code, on the surface of the temperature-sensitive adhesive layer 9 carried on base material 8 of the image receiving sheet 7.

The temperature-sensitive adhesive layer 9 has a smooth surface in comparison with that of a usual paper and is provided with a good adhesive property caused by the heat of the thermal head 10, so that the ink layer 3 of the thermo-transfer sheet 1 can be transferred with remarkable performance and the printing operation can be also performed with relatively low energy.

The thermo-transfer image receiving sheet 7 on which the print image is formed is cut so as to have a desired size by a pair of cutters 65 and 65 to thereby obtain the label 6 as a product. With the label 6 thus produced, in a case where the image ink layer 3' is a correct image of the bar code, the non-reverse image of the bar code can be identified from the side at which the image ink layer is formed and when the image ink layer 3' is a reverse image of the bar code, the correct image can be identified from the side of the base material by utilizing the base material 8 of the thermo-transfer image receiving sheet 7 with a transparent plastic film.

In the described embodiment, the label manufacturing method is described in a case where the thermo-transfer sheet 1 and the image receiving sheet 7 shown in FIG. 1 are utilized, but the label can be produced in cases where the thermo-transfer sheets and the image receiving sheets shown in FIGS. 2 to 5 are utilized by substantially the same manner as that described above with reference to FIG. 1.

FIG. 7 is a schematic view representing a method of manufacturing a label according to another embodiment of this invention. Referring to FIG. 7, the thermo-transfer image receiving sheet 7 rolled up around a roll, not numbered, is fed on the outer periphery of a platen roll 74 of a printer. The thermo-transfer sheet 1 is laminated on the image receiving sheet 7 on the platen roll 74 and the print forming process is then performed by the thermal head 10, whereby the desired image ink layer 3', i.e. a bar code, is printed on the temperature-sensitive adhesive layer 9 carried on base material 8 of the image receiving sheet 7.

The thermo-transfer image receiving sheet 7 on which the image ink layer 3' is formed is cut so as to have a desired size by a pair of cutters 75 and 75 to thereby obtain the label 6' as a product. During this process, as shown in FIG. 7, a laminating machine comprising a pair of rolls 76 and 76 may be arranged. In this case, the thermo-transfer image receiving sheet 7 is fed to the laminating machine in which a transparent film 80 is laminated to carry out a thermo-laminating operation to laminate the transparent film 80 on the surface of the sheet 7.

As a material of such transparent film, is listed up polyester, polyethylene, polypropylene, polyvinyl chloride, cellulose acetate, or polycarbonate and, hence, any one of known transparent resins may be utilized for the transparent film 80. It is desired for the transparent film to have a thickness of 5 to 50 μm. According to this invention, it is not always necessary to preliminarily form an adhesive layer on the transparent film.

With the label 6' thus produced, in a case where the image ink layer 3' is a non-reverse image of the bar code, the non-reverse image of the bar code can be identified from the side of the transparent film 80. In a case where the image ink layer 3' is a reverse image of the bar code, the non-reverse image can be identified from the side of the base material by forming the base material 8 of the thermo-transfer image receiving sheet with a transparent plastic film. In this case, an opaque material such as a label paper may be substituted for the transparent film 80.

EXPERIMENTAL EXAMPLES

This invention is described further in detail hereunder by way of concrete experimental examples, in which terms of parts and % generally represent weight parts and weight % even if the specific limitation is not made.

EXAMPLE 1

A thermo-transfer sheet was prepared by dissolving a temperature-sensitive adhesive into xylene with the components described below and gravure coating the same with 20 g/m$^2$ of solidified components on an art paper having a thickness of 70 μm.

Adhesive Composition

Styrene-butadiene rubber (Solplene 1204, produced by ASAHI KASEI): 2.4 parts
Chlorinated polypropylene (SUPER CRON 907LL, produced by SANYO KOKUSAKU PULP Co. Ltd.): 2.0 parts
Vinyl chloride-vinyl acetate copolymer (Sumitate KC10, produced by SUMITOMO KAGAKU): 10.0 parts
Petroleum resin (Neo polymer-130, produced by NIHON SEKIYU): 5.0 parts
Microsilica (Matting agent OK-412, produced by DEGUSSA): 0.4 parts
Polyethylene wax (MICROFINE 8 F GOLD, produced by GOODYEAR): 1.5 parts
Amide wax (AP65, produced by Tenka Polymer Co. Ltd.): 1.5 parts
Xylene: 80.0 parts A thermo-transfer sheet was prepared by coating, with a gravure reverse method, a gravure printing ink of the following composition with 1.5 g/m$^2$ of solidified components on a polyester film having a thickness of 6 μm and having a rear surface on which a heat-proof layer is formed and thereafter drying the same.

Ink Composition

Carbon black (Seast S, produced by Tokai Carbon Co. Ltd.): 10.0 parts
Rubber chloride (CR-20, produced by ASAHI DENKA): 10.0 parts
Chlorinated polymethylpentene (SUPER CRON 602, produced by SANYO KOKUSAKU PULP Co. Ltd.): 11.0 parts
Plasticizer (DIBUTYLAZIPATE DBA, produced by DAIHACHI KAGAKU): 3.0 parts
Polyethylene wax (A WAX, produced by BASF): 2.0 parts
Toluene: 60.0 parts
N-heptane: 4.0 parts The softening point of the transfer ink of the thermo-transfer sheet was measured by a TMA (Thermal Mechanical Analysis) testing machine (SSC 5000, produced by SEIKO ELECTRONICS) using the penetration method, and the measured softening point was 180° C. In this measurement, the softening point was determined under the conditions that the displacement of 10% of the needle position was designated by using a needle having a front point having a diameter of 1 mm and a press load 5 g of the needle to a material to be measured.

In the next step, a bar code label was prepared, in accordance with this invention, from the thermo-transfer sheet and the thermo-transfer image receiving sheet of the characters described above by printing a non-reverse image by utilizing a bar code printer (BC8, produced by AUTONIX).

EXAMPLE 2

A thermo-transfer image receiving sheet was prepared by a bar code formed of a paper prepared by laminating an adhesive layer and a release layer on the rear surface of a base material such as shown in FIG. 3. A bar code label was prepared by substantially the same manner as that described in the Example 1 by utilizing a thermo-transfer sheet provided with a temperature-sensitive adhesive layer prepared by gravure coating the adhesive of the composition described in the Example 1 on the ink layer with the same solidified component reference.

EXAMPLE 3

A bar code label on which a bar code non-reverse image is printed was prepared by substantially the same manner as that of the Example 2 except that an ink for the thermo-transfer sheet of the following composition was utilized.

Ink Composition

Carbon black (Seast S, produced by Tokai Carbon Co. Ltd.): 10.0 parts
Rubber chloride (CR-20, produced by ASAHI DENKA): 10.0 parts
Chlorinated polymethylpentene (SUPER CRON 602, produced by SANYO KOKUSAKU PULP Co. Ltd.): 11.0 parts
Cross Linking Agent (POLYISOCYANATE, produced by MOROBOSHI INK K.K.): 3.0 parts
Polyethylene wax (A WAX, produced by BASF): 2.0 parts
Toluene: 60.0 parts
N-heptane: 4.0 parts The softening point of the transfer ink of the thermo-transfer sheet was 220° C.

EXAMPLE 4

A bar code label on which a bar code non-reverse image is printed was prepared by substantially the same manner as that of the Example 1 except that an ink for the thermo-transfer sheet of the following composition was utilized.

Ink Composition

Carbon black (Seast S, produced by Tokai Carbon Co. Ltd.): 10.0 parts
Acrylic polyol (TP5000, produced by Tenka Polymer Co. Ltd.): 10.0 parts
Chlorinated polymethylpentene (SUPER CRON 602, produced by SANYO KOKUSAKU PULP Co. Ltd.): 11.0 parts
Plasticizer (DIBUTYLAZIPATE DBA, produced by DAIHACHI KAGAKU): 3.0 parts
Cross Linking Agent (POLYISOCYANATE, produced by MOROBOSHI INK K.K.): 3.0 parts
Polyethylene wax (A WAX, produced by BASF): 2.0 parts
Toluene: 60.0 parts
N-heptane: 4.0 parts The softening point of the transfer ink of the thermo-transfer sheet was 290° C.

EXAMPLE 5

A bar code label on which a bar code non-reverse image is printed was prepared by substantially the same manner as that of the Example 1 except that an ink for the thermo-transfer sheet of the following composition was utilized.

Ink Composition

Carbon black (Seast S, produced by Tokai Carbon Co. Ltd.): 10.0 parts
Rubber chloride (CR-20, produced by ASAHI DENKA): 10.0 parts
Chlorinated polymethylpentene (SUPER CRON 602, produced by SANYO KOKUSAKU PULP Co. Ltd.): 11.0 parts
Plasticizer (DIBUTYLAZIPATE DBA, produced by DAIHACHI KAGAKU): 7.0 parts
Polyethylene wax (A WAX, produced by BASF): 2.0 parts
Toluene 60.0 parts
N-heptane 4.0 parts The softening point of the transfer ink of the thermo-transfer sheet was 130° C.

EXAMPLE 6

A bar code label was prepared by laminating and bonding a transparent polyester film having a thickness of 12 μm on the surface of the bar code label prepared by the procedure of Example 1 by passing through a pair of hot rolls of a temperature of 110° C.

COMPARATIVE EXAMPLE 1

A bar code label on which a bar code non-reverse image is printed was prepared by substantially the same manner as that of the Example 1 except that an ink for the thermo-transfer sheet of the following composition was utilized.

Ink Composition

Carbon black (SEAST S, produced by Tokai Carbon Co. Ltd.): 10.0 parts
Rubber Chloride (CR-20, produced by ASHAHI DENKA): 10.0 parts
Chlorinated polymethylpentene (SUPER CRON 602, produced by SANYO KOKUSAKU PULP Co. Ltd.): 11.0 parts
Plasticizer (DIBUTYLAZIPATE DBA, produced by DAIHACHI KAGAKU): 10.0 parts
Polyethlene wax (A WAX, produced by BASF): 2.0 parts
Toluene: 60.0 parts
N-heptane: 4.0 parts The softening point of the transfer ink of the thermo-transfer sheet was 100° C.

COMPARATIVE EXAMPLE 2

A bar code label on which a bar code non-reverse image is printed was prepared by substantially the same manner as that of the Example 1 except that an ink for the thermo-transfer sheet of the following composition was utilized.

Ink Composition

Carbon black (Seast S, produced by Tokai Carbon Co. Ltd.): 10.0 parts
Acrylic polyol (TP5000, produced by Tenka Polymer co. Ltd.): 10.0 parts
Chlorinated polymethylpentene (SUPER CRON 602, produced by SANYO KOKUSAKU PULP Co. Ltd.): 11.0 parts
Plasticizer (DIBUTYLAZIPATE DBA, produced by DAIHACHI KAGAKU): 3.0 parts
Cross Linking Agent (POLYISOCYANATE, produced by MOROBOSHI INK K.K.): 10.0 parts
Polyethylene wax (A WAX, produced by BASF): 2.0 parts
Toluene: 60.0 parts
N-heptane: 4.0 parts The softening point of the transfer ink of the thermo-transfer sheet was 320° C.

COMPARATIVE PERFORMANCES (1) The bar code labels prepared by the respective Experimental Examples 1 to 6 and the Comparative Example 1 were subjected to friction-proof tests at an environmental temperature of 110° C. by utilizing a friction-proof testing machine (Load: 100 g). The labels were rubbed and examined by a bar code reader. The tests resulted in that the bar code labels of the Examples 1 to 6 provided good reading performance, but the printed image of the bar code of the Comparative Example 1 was crushed and was not readable by the reader. With the bar code label of the Comparative Example 2, the printed image was not clear because the transfer ink layer was not clearly cut out and the bar cord label was erroneously read even under no thermo-friction treatment.

(2) With the bar code labels of Experimental Examples 1 and 3 to 5 and the Comparative Example 1, the tests regarding the friction-proof property, the heat-proof property, and the solvent-proof property were carried out and the following test results were obtained as shown by Table 1.

TABLE 1

| | Experimental Examples | | | | Comparative Example |
|---|---|---|---|---|---|
| Item | 1 | 3 | 4 | 5 | 1 |
| Iron | ○ | ○ | ◎ | ○ | X |
| Eraser | ○ | ◎ | ◎ | ◎ | Δ |
| I P A | ○ | ◎ | ◎ | ◎ | ○ |
| Kerosene | X | ○ | ◎ | ○ | X |
| Car Wax | ○ | ◎ | ◎ | ◎ | Δ |
| Benzene | X | Δ | ○ | Δ | X |

◎: No blot and no contamination
○: Little blot and little contamination
Δ: Much blot and much contamination
X: Much blot and much contamination (printed matter is hardly readable)
Items:
Iron: Linerly rub one time at 120° C. (only weight of an iron)
Eraser: Plastic eraser (produced by TOMBO, PE-04A), rub ten times (load: about 500 g)
I P A: Gauze impregnated with Isopropyl alcohol (produced by NIHON SEKIYU, first grade), rub ten times (load: about 200 g)
Kerosene: Gauze impregnated with kerosene, rub ten times (load: about 200 g)
Car Wax: Wax (produced by NEW HOPE, new clean wax), rub five times (load: about 200 g)
Benzene: Gauze impregnated with benzene, rub five times (load: about 200 g)

As can be understood from the above Table 1, the bar code labels prepared by the thermo-transfer sheet according to this invention provided excellent friction-proof property, solvent-proof property, and heat-proof property in comparison with the conventional bar codes.

It is to be understood by persons skilled in the art that this invention is not limited to the embodiments described hereinabove and many changes and modifications may be made without departing the scopes of the appended claims.

What is claimed is:

1. A thermo-transfer sheet to be laminated on a thermo-transfer image receiving sheet and heated by a thermal head from a rear side of the thermo-transfer sheet to print an ink image having a predetermined area on the thermo-transfer image receiving sheet, comprising:
   - a base film;
   - a release layer formed on one surface of said base film;
   - a transfer ink layer formed on a surface of said release layer; and
   - a temperature-sensitive adhesive layer formed on a surface of said transfer ink layer, wherein said transfer ink layer contains polymethylpentene as a binder.

2. A thermo-transfer sheet according to claim 1, wherein said transfer ink layer has a thickness in a range of 0.1 to 5 $\mu m$.

3. A thermo-transfer sheet according to claim 1, wherein said polymethylpentene is chlorinated polymethylpentene.

* * * * *